(12) United States Patent
Cordani et al.

(10) Patent No.: US 10,991,923 B2
(45) Date of Patent: Apr. 27, 2021

(54) LITHIUM ION BATTERY SUPPRESSION SYSTEM

(71) Applicant: GelTech Solutions, Inc., Jupiter, FL (US)

(72) Inventors: Peter Cordani, Palm Beach Gardens, FL (US); Michael Reger, Jupiter, FL (US)

(*) Notice: Subject to any disclaimer, the term of this patent is extended or adjusted under 35 U.S.C. 154(b) by 24 days.

(21) Appl. No.: 16/382,709

(22) Filed: Apr. 12, 2019

(65) Prior Publication Data
US 2019/0319234 A1 Oct. 17, 2019

Related U.S. Application Data

(60) Provisional application No. 62/657,129, filed on Apr. 13, 2018.

(51) Int. Cl.
| | | |
|---|---|---|
| *H01M 2/10* | (2006.01) | |
| *A62C 3/16* | (2006.01) | |
| *A62C 13/62* | (2006.01) | |
| *A62C 13/76* | (2006.01) | |
| *H01M 10/0525* | (2010.01) | |
| *H01M 10/658* | (2014.01) | |
| *A62C 3/07* | (2006.01) | |
| *H01M 10/48* | (2006.01) | |

(52) U.S. Cl.
CPC .............. *H01M 2/1094* (2013.01); *A62C 3/07* (2013.01); *A62C 3/16* (2013.01); *A62C 13/62* (2013.01); *A62C 13/76* (2013.01); *H01M 2/1077* (2013.01); *H01M 10/0525* (2013.01); *H01M 10/486* (2013.01); *H01M 10/658* (2015.04); *H01M 2200/10* (2013.01); *H01M 2220/30* (2013.01)

(58) Field of Classification Search
CPC ............. H01M 2/1094; H01M 10/658; H01M 2200/00
See application file for complete search history.

(56) References Cited

U.S. PATENT DOCUMENTS

| | | | | |
|---|---|---|---|---|
| 2004/0214074 A1* | 10/2004 | Gaignerot | ............... | H01M 2/12 429/53 |
| 2015/0221914 A1* | 8/2015 | Page | .................. | H01M 2/1252 429/82 |
| 2016/0107010 A1* | 4/2016 | Cordani | ................. | B65D 75/30 169/54 |

* cited by examiner

*Primary Examiner* — Olatunji A Godo

(57) ABSTRACT

The present invention is a fire suppression apparatus for mitigating a battery fire and the effects of a thermal event within a battery pack. The system comprises a fire suppressant apparatus that is incorporated into the storage modules of the lithium ion batteries. Each storage module includes a container filled with a fire suppressant that is pressurized with a compressed gas.

8 Claims, 3 Drawing Sheets

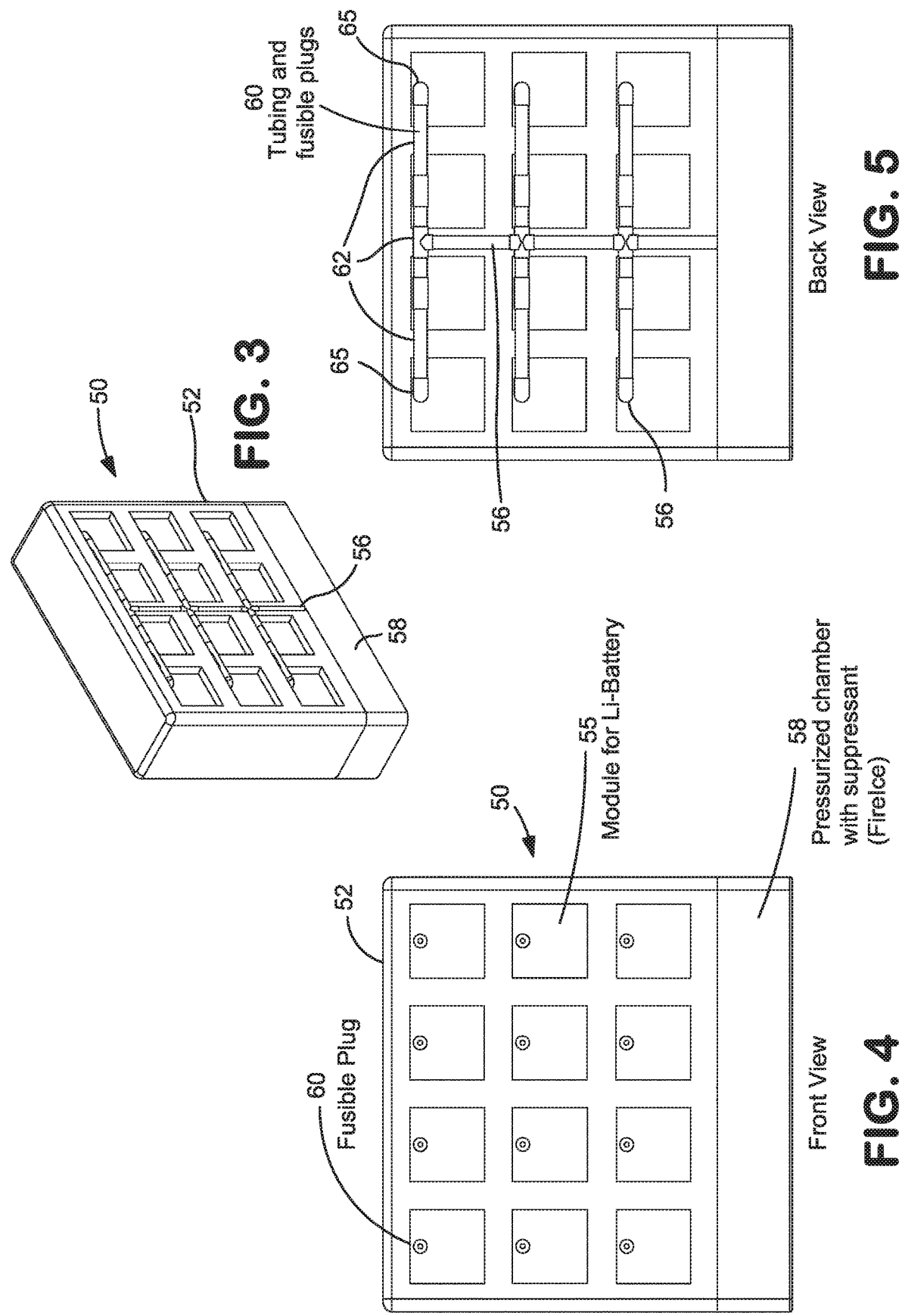

LITHIUM ION BATTERY SUPPRESSION SYSTEM

CROSS-REFERENCE TO RELATED APPLICATIONS

This non-provisional U.S. patent application claims the benefit of priority from U.S. Provisional Patent Application 62/657,129, filed 13 Apr. 2018. The disclosure of that application is hereby incorporated by reference in its entirety where appropriate for teachings of additional or alternative details, features, and/or technical background, and priority is asserted from each.

FIELD OF THE INVENTION

The present invention relates generally to batteries and, more particularly, to a means for mitigating a vehicle mounted battery pack thermal runaway event.

BACKGROUND OF THE INVENTION

Advances in technology have enabled the design of long lasting and cost-effective battery powered vehicles. However, these advances are not without problems. The most advanced lithium ion batteries can fail for a number of reasons. The most catastrophic failure is when a lithium ion battery has a thermal runaway. A thermal runaway is an event that occurs when the internal reaction rate of a battery increases without control. Despite the best efforts of manufacturers, the rechargeable lithium ion battery is not stable if operated outside design parameters. As manufacturers attempt to obtain longer length out of less material, the lithium ion batteries have become more susceptible to thermal runaway. The thermal runaway can be caused by a number of situations including, but not limited to, improper battery charging, breach of a battery caused by an accident, exposure to extreme temperatures, or manufacturing defects. In such an event, a battery cell generates so much heat that the battery, including the materials used to house the battery, reaches a point of combustion.

A thermal runaway begins with a cell in the battery increasing in temperature, as the environment is unable to absorb the excess heat from the temperature increase. As the temperature further increases, a pressure within the cell also increases. More advanced batteries include a pressure safety release which may help to arrest the thermal runaway. Those batteries lacking a safety release and those batteries whose safety release cannot keep up with the thermal increase, results in the formation of perforations in the cell casing. Upon the perforation of a cell casing, the battery breach causes a thermal runaway event has the battery material is exposed to oxygen. Further, hot gas released by the breach can now breach adjoining cells or compromise the battery housing leading to additional breaches, thus a runaway event is created.

Once the runaway event takes place, it is nearly impossible to stop. The hot gases produced, namely carbon dioxide and hydrocarbon vapors, can lead to spontaneous combustion. The result is a potentially dangerous condition for lithium ion powered vehicle including any passenger within the vehicle. Further, emergency response teams are ill equipped to put out a runaway lithium ion battery fire.

What is needed in the art is a means of arresting a potential thermal runaway battery condition thereby lowering the risk of a spontaneous combustion of battery or materials in close proximity to the battery.

SUMMARY OF THE INVENTION

A system and method for mitigating a lithium ion battery fire and the effects of a thermal event within a lithium ion battery pack by providing an instantaneous release of a fire suppressant at the core of the thermal event. The fire suppressant cools the battery and provides a coating to limit oxygen from reaching the core and extinguishing any combustion. The system comprises a fire suppressant placed in a pressurized container that accompanies the lithium ion battery module or module stack. Each lithium ion battery module includes nozzles strategically positioned fill any voided space in the battery with fire suppressant should a thermal event occur. The canister or container holding, the suppressant need only be large enough to fill the voided space of a single battery cell module. The container is pressurized and coupled to a distribution line having fusible plugs positioned along each battery module. Alternatively battery module stacks that slide into a module container employ a network distribution line wherein each module stack includes a fusible plug. In the preferred embodiment a mixture of super absorbent polymer and water forms an admixture that forms a superior fire suppressant and the admixture is nonconductive. The admixture has a viscosity that enables it to be contained within a specific area without spreading it to adjacent areas. The admixture also encapsulates the noxious and toxic gases produced by fires and prevents the release of these toxic gases.

Accordingly, it is an objective of the invention to reduce the potential of a lithium ion batteries wherein an over temperature event caused by a short-circuit or overcharge causes an unacceptable temperature buildup.

Still another objective of the invention is to provide a system that will lower the temperature of heated gas expelled from a lithium ion battery as it interacts with oxygen.

Another objective of the invention is to provide a system that will limit collateral damage to vehicle, passengers, and/or emergency response teams by providing fire suppression at the point of combustion.

It is yet another objective of the present invention to provide a method of suppressing a battery fire utilizing substantially less fire suppressant due to the disbursement of material at the source of heat creation.

It is still yet another objective of the present invention to disclose an admixture of super absorbent polymer and water that has viscosity sufficient to enable it to adhere to horizontal, vertical, inclined, and curved battery surfaces.

It is a still further objective of the present invention to provide a method of extinguishing a battery fire that results in a less expensive cleanup process.

Other objectives and advantages of this invention will become apparent from the following description taken in conjunction with any accompanying drawings wherein arc set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 3 is a perspective view of a lithium ion battery modular stack;

FIG. 4 is a front view thereof; and

FIG. 5 is back view thereof.

DETAILED DESCRIPTION OF THE INVENTION

Figure 1:
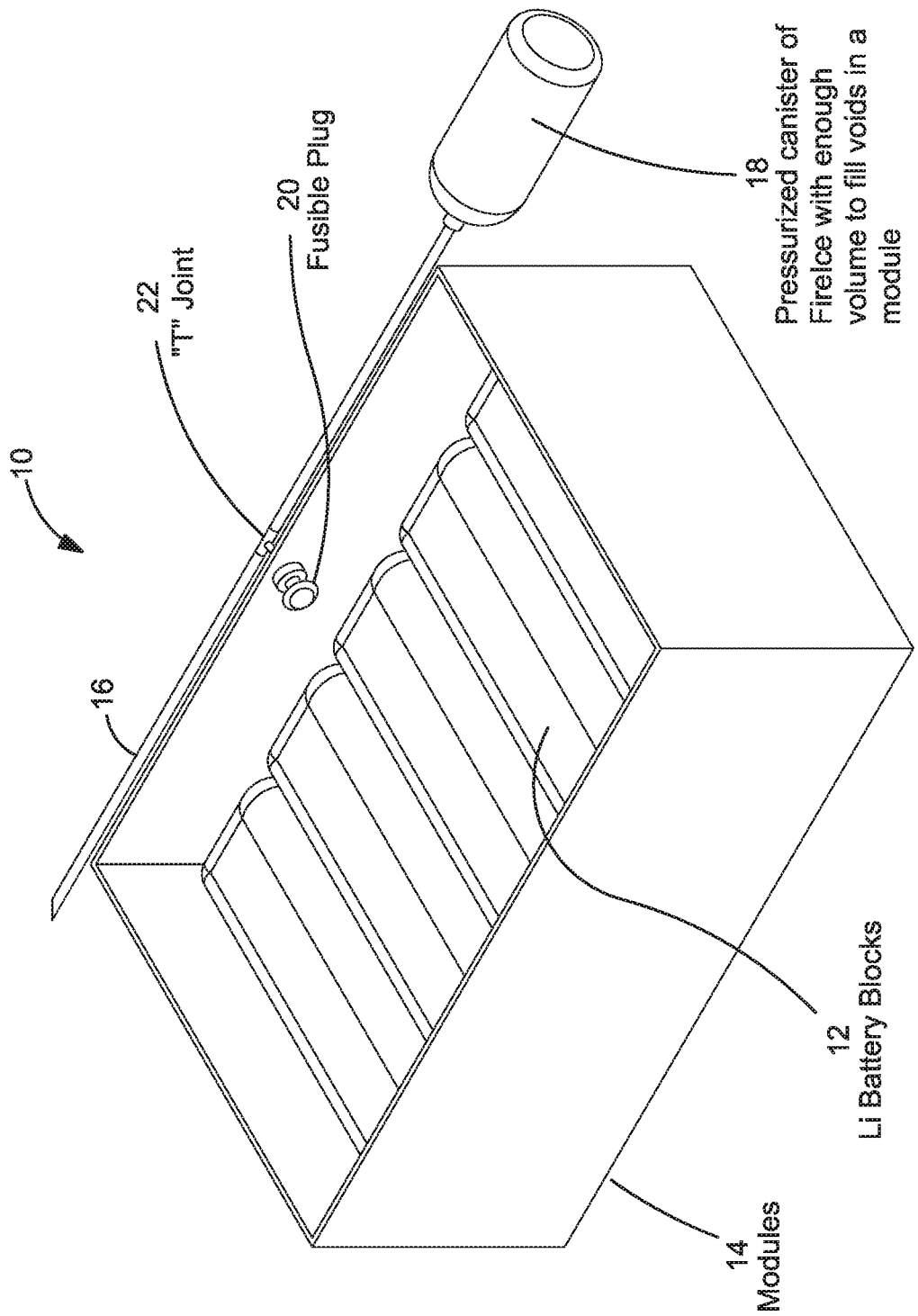
FIG. 1 is a perspective view of a lithium ion battery module.
Figure 2:
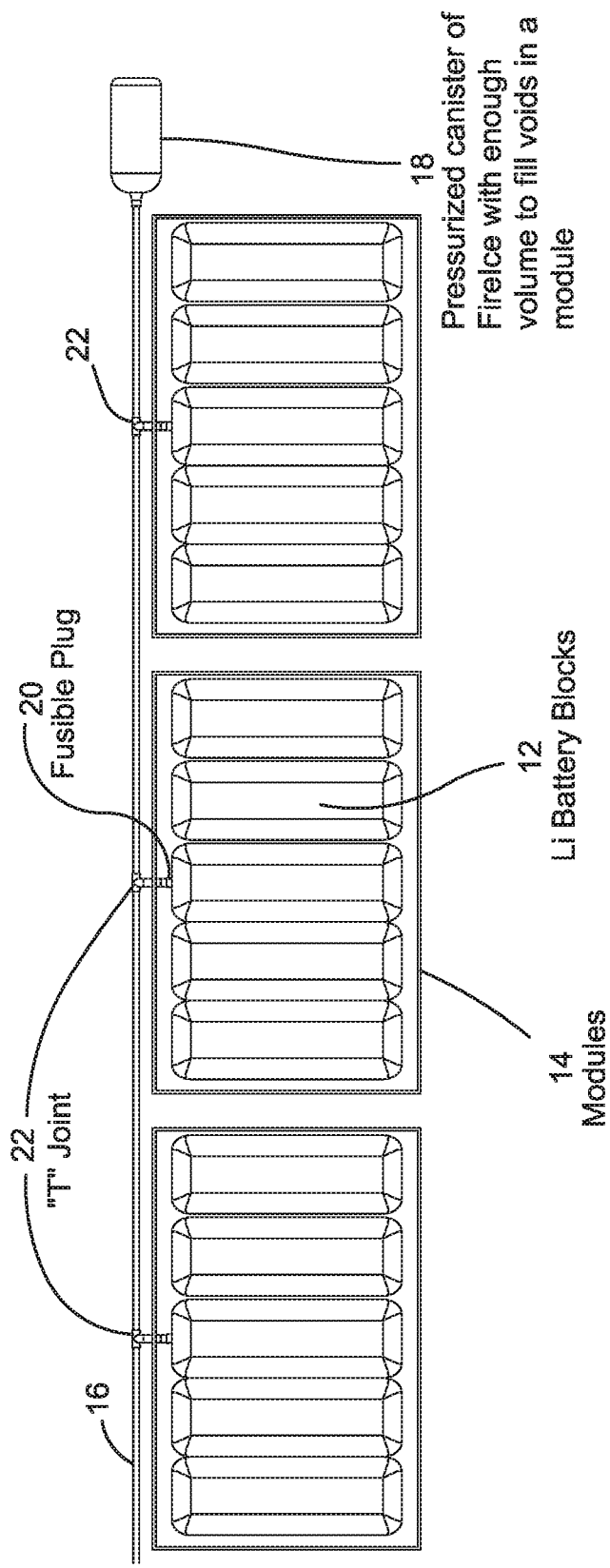
FIG. 2 is a top view thereof.

A fire suppression apparatus for mitigating a lithium ion battery fire by providing an instantaneous filling of a battery module void with a fire suppressant is described. As depicted in general with FIGS. 1 & 2, the lithium ion battery suppression system 10 utilizes at least one modular battery pack 12 contained within a first battery module 14 and comprised of a plurality of cells. At least one distribution tube 16 is mounted along each said modular battery pack 12 with a pressurized canister mounted to each distribution tube 16 along a T-joint 22 or at the end of the distribution tube. The fusible plug releases the fire suppressant upon a thermal event occurring within the modular battery pack 12, the fusible plug mounted closest to the thermal event will release fire suppressant directly to the breaching battery pack 12. The aperture formed by the fusible plug 20 may duplicate a spray nozzle, or additional spray nozzles may be strategically positioned along the battery pack and arranged to fill any voided space in the module with fire suppressant upon a temperature increase. The fire suppressant container 18 holding only enough fire suppressant as necessary to fill the voided space in the battery module 14 so as to provide a compact and lightweight system. When the fusible plugs are subjected to a high battery heat, the plugs release the pressurized admixture. Alternatively battery module stacks that slide into a module container employ a network distribution line wherein each module stack includes a fusible plug.

Positioning a fusible plug 20 at predetermined areas of the battery module provides a means for releasing of the fire suppressant the moment a battery begins to overheat. By releasing a suppressant of the instant invention near the creation of the heat is found to be the most efficient and optimum method of preventing the battery from passing into a thermal runaway. By attacking the area of concern before the battery begins to overheat to the point of cell rupture, the battery does not reach the stage of spontaneous combustion.

While most any fire extinguishing material may be applied, in a preferred embodiment a mixture of super absorbent polymer and water forms an admixture that forms a superior fire suppressant and the admixture is non-conductive. One of the unique properties of the admixture is its ability to cling to the battery material to cool down the battery, coat the surrounding area of the module, and block the area that is most susceptible to breaching from contact with oxygen. The admixture also has a viscosity that enables it to be contained within a specific area without spreading to adjacent areas. These superior properties enable fires to be extinguished more rapidly, and will not lead to the destruction of adjoining product. Depending upon the product that caught fire, toxic gases can be released from materials such as plastic. The super absorbent polymer and water admixture also encapsulates the noxious and toxic gases produced by fires and can stop the release of these toxic gases.

In the preferred embodiment, this system utilizes a hydrated super absorbent polymer in an amount sufficient to extinguish a lithium ion battery fire. Examples of these polymers are cross-linked modified polyacrylamides/potassium acrylate or polyacrylamides/sodium acrylate. Other suitable polymers include, albeit are not limited to, carboxymethylcellulose, alginic acid, cross-linked starches, and cross-linked polyaminoacids. A solid form of the super absorbent polymer is added to water to form an aqueous admixture. The viscosity of the admixture will enable the admixture to remain within a confined area. The properties of the admixture, in particular its viscosity, also enable the admixture to be applied to and remain on vertical, horizontal, and curved surfaces of objects which are on fire or are capable of catching on fire. Adherence of the admixture of super absorbent polymer and water to the surface of an object maintains moisture content at a level which suppresses the spread of the fire by preventing combustion of the object from hot embers and/or flames. In a preferred embodiment, the admixture is sold under the trademark FireIce® and is applied at about 5-8 pounds of FireIce® dry super absorbent polymer added to about 100 gallons of water. Conventional fire suppressant may also be placed in the canister 18 but it is submitted that the most effective material known to date is the hydrated FireIce® super absorbent polymer.

Similarly, the system works equally well with modular stacks as depicted in FIGS. 3-5. In this embodiment, the lithium ion battery suppression system 50 utilizes at least one modular stack battery pack 52 contained within a battery pack enclosure and comprised of a plurality of module cells 55. At least one distribution tube 56 is mounted along each said modular battery pack 12 with a pressurized chamber 58 or canister is filled with the fire suppressant and is coupled to the distribution tube 56. A fusible plug 60 is mounted to each distribution tube 56 along a T-joint 62 or at the end 65 of the distribution tube 56. The fusible plug 60 releases the fire suppressant upon a thermal event occurring within the modular battery 52, the fusible plug 60 mounted closest to the thermal event will release fire suppressant directly to the breaching battery pack 52. The aperture formed by the fusible plug 60 may duplicate a spray nozzle, or additional spray nozzles may be strategically positioned along the battery pack and arranged to fill any voided space in the module with fire suppressant upon a temperature increase. The fire suppressant container chamber 58 holding only enough fire suppressant as necessary to fill the voided space in the battery module cell 55 so as to provide a compact and lightweight system. When the fusible plugs 60 are subjected to a high battery heat, the plugs release the pressurized admixture.

Positioning the fusible plug 60 at predetermined areas of the battery module stack provides a means for releasing of the fire suppressant the moment a battery begins to overheat. By releasing a suppressant of the instant invention near the creation of the heat is found to be the most efficient and optimum method of preventing the battery from passing into a thermal runaway. By attacking the area of concern before the battery begins to overheat to the point of cell rupture, the battery does not reach the stage of spontaneous combustion.

An advantage of the method of extinguishing battery fires is that the hydrated polymer admixture can retain by-products produced by a fire. By entrapping and retaining the ash and other particulates of the fire in a contained mass, the cleanup is facilitated, thus making the cleanup easier and quicker than the cleanup when only water is used to fight a fire. The super absorbent polymer and fire residue can be readily cleaned up by vacuuming or other similar techniques and supporting areas that may include electrical connectors will not be shorted out by the non-conductive fire suppressant.

It is noted that a series of lithium ion battery modules would not all ignite simultaneously. A single cell in a single module is more likely to be the catalyst. By using the fire suppressant that can withstand the extreme temperatures of a lithium ion battery fire and using overwhelming suppression power, thermal runaway can be prevention and the propagation eliminated. Only enough suppressant is necessary to fill the voided space in a single module.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein arc presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention that are obvious to those skilled in the art are intended to be within the scope of the following claims.

What is claimed is:

1. A lithium ion battery suppression system, comprising:
    at least one modular battery pack contained within a first battery pack enclosure and comprised of a plurality of cells;
    a canister filled with a pressurized fire suppressant;
    a distribution tube network having at least one distribution tube mounted along each said modular battery pack coupled to said canister; and
    at least one fusible plug mounted between each said distribution tube and said modular batter pack, retaining said pressurized fire suppressant;
    wherein upon a thermal event occurring within said modular battery pack, said fusible plug mounted closest to the thermal event will release said fire suppressant and allow said fire suppressant to flow from said canister through said distribution tube network and into said modular battery pack, said fire suppressant substantially retaining all by-products of the thermal event.

2. The lithium ion battery suppression system of claim 1, wherein said fire suppressant is of sufficient volume to fill voids in the modular battery pack.

3. The lithium ion battery suppression system of claim 1 wherein said fusible plug released upon the thermal event reaching a predetermined temperature.

4. The lithium ion battery suppression system of claim 3 wherein said predetermined temperature is indicative of a thermal runaway.

5. The lithium ion battery suppression system of claim 1 wherein including a spray nozzle fluidly coupled to each said fusible plug, said spray nozzle providing directional flow of fire suppressant released through said fusible plug.

6. The lithium ion battery suppression system of claim 1 wherein said fire suppressant is a hydrated super absorbent polymer.

7. The lithium ion battery suppression system of claim 6 wherein said hydrated super absorbent polymer is FireIce® admixed at a ratio of about 5-8 pounds of dry super absorbent polymer to about 100 gallons of water.

8. The lithium ion battery suppression system of claim 1 wherein a volume of said fire suppressant stored in said canister is limited to the amount of volume necessary to fill the voided space in a single module.

* * * * *